United States Patent Office 3,317,445
Patented May 2, 1967

3,317,445
ALKALI RESISTANT POLYESTER RESINS
FROM ROSIN
Noah J. Halbrook and Ray V. Lawrence, Lake City, Fla., assignors to the United States of America as represented by the Secretary of Agriculture
No Drawing. Filed Aug. 27, 1964, Ser. No. 392,661
27 Claims. (Cl. 260—26)

A nonexclusive, irrevocable, royalty-free license in the invention herein described, for all governmental purposes, throughout the world, with the power to grant sublicenses for such purposes, is hereby granted to the Government of the United States of America.

This invention relates to a process for modifying rosins with lactones and to the modified products. It also relates to the use of the lactone modified-rosin moiety in the preparation of polyester resins, casting resins, webbing coated with these casting resins, and to the products produced therefrom.

It is a prime object of our invention to modify rosin with a lactone, thereby forming a lactone-modified rosin moiety comprising polycarboxylic groups.

It is a further object of our invention to esterify the rosin carboxylic acid groups with a polyol, such as a dihydric alcohol, at high temperatures to form an alkali-resistant polyester resin chain wherein the lactone-modified rosin moiety is in the center of the polyester chain.

It is a still further object to extend these rosin-polyesters with the unsaturated dibasic acids, fumaric and/or maleic and additional polyol to form extended alkali-resistant polyester resins containing unsaturated groups and rosin in the center of the polyester chains.

It is a still further object to produce casting resins comprising vinyl monomers and the extended, unsaturated polyester resins containing rosin in the center of the polyester chain.

It is a still further object to crosslink these casting resins, thereby forming plastics (copolymers) suitable for a variety of commercial uses. These novel plastics are characterized by their low specific gravities, their tendency to shrink less during curing, their improved adhesion to webbing, particularly glass fiber, and their resistance to water. Most important, they are alkali resistant.

As used herein, the term "rosin" includes unmodified gum rosin, unmodified wood rosin, or unmodified tall-oil rosin. The term "lactone" includes β-propiolactone and the polymer of β-propiolactone. The term "lactone-modified rosin moiety" relates to polycarboxylic acid of rosin derived in part from the addition of lactone to the rosin. The term "polyester resin" relates to the chains formed by the reaction of a di-hydric alcohol (or polyol) such as a glycol, with the carboxylic acids in the lactone-modified rosin moiety. (This will frequently be referred to below as Resin A.) The term "extended," unsaturated polyester resin (Resin B) relates to extended, or longer, polyester chains resulting from the reaction of Resin A with an unsaturated, dibasic acid such as fumaric or maleic, the latter including maleic anhydride, and additional polyol. The term "casting resin" relates to compositions comprising Resin B and vinyl monomers. This is Resin C. The term "plastic" or "copolymer of polyester resins" (Resin D) relates to the plastic composition formed when Resin C is copolymerized or crosslinked with a vinyl monomer. The term "webbing" includes woven or nonwoven fibrous materials comprising cellulose, fiber glass, and the natural and synthetic nitrogen-containing fibrous materials.

As noted above, polyester resin chains prepared from the reaction product of a lactone-modified rosin moiety and a polyol such as a glycol, in which the carboxyl groups of the rosin moiety are esterified by the glycol and the rosin moiety is in the center of the chain (Resin A) are characterized by excellent water and alkali resistance as will be discussed more fully below. These desirable but unexpected characteristics are unaffected by extending the polyester (Resin A) with an unsaturated fumaric or maleic acid (Resin B) or by admixing with a vinyl monomer (Resin C). Consequently, when Resin C is copolymerized, these excellent water- and alkali-resistant characteristics are imparted to the resulting copolymers (Resin D), and their commercial utility as laminating, coating, molding, and casting resins is markedly increased.

Various unsaturated polyester resins from rosin capable of being copolymerized with vinyl monomers have been described previously. Root in U.S. Patent 2,938,006, issued May 24, 1960, describes a resin comprising a polymerizable improved rosin adduct of a poly (alkylene fumarate). Root does not esterify the carboxyl group of a rosin. He makes a polyester chain and then adds rosin to some of the fumaric acid in this polyester chain by the Diels-Alder reaction. As a result, the free carboxylic groups in rosin are readily attacked by alkali.

Fikentscher et al., in U.S. Patent 2,973,332, issued Feb. 28, 1961, prepared unsaturated polyester resins from α-β-unsaturated polycarboxyl acids and polyhydric alcohols by coemploying in their preparation at least 30% of colophony, abietic acid, or their reaction products with dienophilic (ring-forming) compounds. They further state that it is also possible to use diene adducts of colophony or abietic acid with dienophilic components in which part of the carboxylic acid groups is not present in free form such as the diene adducts of maleic acid diesters or acrylic acid esters. Finkentscher et al., further state that when using colophony or abietic acid it is not essential to carry out the formation of the diene adduct separately from the polyester resin. Such a process would not produce polyesters with rosin in the center of the polyester chain. However, the Finkentscher et al. products have improved heat stability. Thus, it is seen that there is a real need in the rosin field for an effective method for producing polyesters with rosin in the center of the polyester chain, and thereafter stabilizing the carboxylic acids of the rosin against degradation by alkali and/or water.

We have now found that by modifying the rosin with a lactone to give a polycarboxylic acid and thereafter esterifying these acids with a polyol, such as a glycol, the lactone-modified rosin moiety becomes the center of the polyester chain. As noted above, this is Resin A, and can be extended with alternate units of fumaric or maleic acid to give Resin B. The latter may then be admixed with a vinyl monomer, such as styrene, to give a casting resin (Resin C). The latter may then be copolymerized by means familiar to those skilled in the art to produce plastic compositions (Resin D).

It is an advantage of our invention that the lactone-modified rosin moiety (sometimes referred to as the rosin adduct), is quite stable and may be stored for long periods of time.

It is a further advantage that when at least 12 parts of the lactone per 100 parts rosin (parts being by weight) are used in modifying the rosin, the resulting modified rosin is soluble in carbon tetrachloride and crystallizes out as the dicarboxylic acid of rosin. This product will be discussed more fully below.

It is a still further advantage that Resin A also is stable and may be shelf-stored for long periods of time.

It is a still further advantage that Resin B also is stable and may be shelf-stored for long periods of time. However, when Resin B is admixed with a vinyl monomer, such as styrene, to produce a casting resin (Resin C), this composition must be stored under an inert gas in sealed containers, preferably tin.

It is a still further advantage that for those operators who have sufficient, useful equipment the various steps may be conducted sequentially, thereby eliminating the necessity of isolating and storing the various products between steps.

In general, the process of our invention may be described as follows:

(1) Condense the rosin and the lactone.
(2) Prepare a polyol ester of the lactone-modified rosin.
(3) Extend the ester chain started in Step 2 by reacting it with fumaric acid (or maleic anhydride) and additional glycol.
(4) Admix the product of Step 3 with a vinyl monomer, such as styrene.
(5) Copolymerize the products of Step 4 without or with webbing to produce castings, coatings, laminated products, etc.

As so described, the process of the present invention appears deceptively simple. However, each of the several steps is critical. Each involves certain criteria which within certain ranges must be observed. Therefore, each will be more fully discussed in relation to the problem solved thereby, as well as its place in the overall treatment. Most important, the product resulting from each step is novel.

MODIFYING THE ROSIN WITH LACTONE

In this Step (1) the rosin and lactone are condensed. This reaction is best carried out between 160 and 250° C. When $\beta$-propiolactone is used, the reaction of the lactone with the rosin takes place very slowly below 200° C., but it is desirable to add the $\beta$-propiolactone to the rosin in the reaction vessel while the rosin temperature is less than 200° C. to avoid excessive refluxing. At about 170° C. up to 25 parts of $\beta$-propiolactone can be added per 100 parts of rosin over a period of 25 minutes without excessive refluxing. It is usually desirable to blow a slow stream of inert gas over the surface of the molten rosin for a few minutes before adding the $\beta$-propiolactone to remove any water that may be present. While the $\beta$-propiolactone can be added to the rosin at any temperature up to 200° C. without difficulty, there is an additional advantage in heating the rosin up to about 170° C. before the $\beta$-propiolactone is added. When rosin is heated above 150° C., there is usually a small amount of water formed, which probably comes from the decomposition of oxidation products. If the $\beta$-propionlactone is added to the rosin before this water is removed, some of the $\beta$-propiolactone will react with this water and will not be available to react with the rosin. This wasted lactone adds to the expense of the operation. After addition of the $\beta$-propiolactone, the temperature of the recation mixture is raised as rapidly as possible without excessive refluxing to about 230° C. It usually requires about three hours at 200° to 230° C. for the reaction of $\beta$-propiolactone with rosin to go to completion. Best results were obtained by adding from 4 to 20 parts by weight of $\beta$-propiolactone per 100 parts of rosin. The major reaction product formed in this step is a rosin dibasic acid. During this reaction, the acid number of the composition increases, sometimes reaching values ranging from about 230 to 300. Similar but not identical reaction porducts can be prepared by substituting $\beta$-propiolactone polymer (J. Am. Chem. Soc. 70, 998–1006 (1948)) for the $\beta$-propiolactone in the first step. In modifying rosin with $\beta$-propiolactone polymer it is not necessary to preheat the rosin before adding the modifying agent.

As noted above, when the amount of lactone to rosin is at least 12 parts per 100 by weight, the lactone-modified product is soluble in carbon tetrachloride from which solution it crystallizes as a rather pure rosin dicarboxylic acid. This product has a neutral equivalent of 187.3.

The uncrystallized lactone-modified rosin, and the carbon tetrachloride crystallized material are both shelf stable and may be readily recovered from the reaction vessel for subsequent use. The lactone-modified rosin is a rather hard solid having a ring-and-ball softening point of about 86–130° C., depending on the particular polyol (dihydric alcohol) used.

ESTERIFYING THE LACTONE-MODIFIED ROSIN

The second step involves the preparation of a polyol ester of the $\beta$-propiolactone-modified rosin (Resin A). This step is critical. Unless the high acid number obtained above is reduced to 30 or lower (preferably about 5–25), satisfactory esterification is not achieved. It is well known that the rosin carboxyl is difficult to esterify (Pohle & Smih, Ind. Eng. Chem. 34, 849–52 (1942)) and to accomplish any reasonable degree of esterification, temperatures of 260 and 300° are required. The modified rosin and the desired polyol are heated under an inert atmosphere, such as nitrogen or carbon dioxide, at about 275° C. until the desired acid number has been reached. The exact conditions and rate of addition of the polyol will depend to a great extent on the particular glycol used. Polyols such as ethylene glycol, diethylene glycol, triethylene glycol, propylene glycol, dipropylene glycol, 1,2-propanediol, 1,3-propanediol, and 1,4-butanediol may be used to form these esters. It is desirable to use an excess of glycol or diol in this step so that most of the polyester chains have terminal hydroxyl groups. It is an advantage of our invention that the several steps may be carried out in sequence without isolation of the novel products produced in these steps. However since $\beta$-propiolactone is known to react with alcohols to give hydroxy propionic acid derivatives, the addition of the polyol should not take place until after the rosin-$\beta$-propiolactone condensation has been completed. As might be expected, the use of an excess glycol or diol speeds up the esterification of the lactone-modified rosin. The excess used in this step is substracted from the amount of glycol required in Step 3, as will be discussed below.

Once the rosin carboxyl group has been esterified, it is very difficult to saponify. For example, conditions used for the quantitative saponification of a fatty acid ester usually saponified less than 10% of a rosin ester (Resin A). Thus, once this rosin ester has been formed, it is extremely resistant to alkali and water and imparts these properties to all the resin in which Resin A may become a component resin.

This polyester resin (Resin A) is quite stable and has good shelf life. Consequently, it is readily recovered and may be stored in commercial containers. When diethylene glycol is used as the esterifying agent, the polyester resin is a viscous liquid; when 1,2-propylene glycol is used as the esterifying agent, the polyester resin is a solid. Depending on the glycol used, these polyester resins will vary from viscous liquids to hard resins.

If desired, the excess polyol may be removed by vacuum distillation or steam stripping. As might be expected, the product will change somewhat during the removal of the polyol, but it has satisfactory use in the subsequent operations.

EXTENSION OF THE ROSIN-POLYESTER CHAIN

The third step involves the extension of the polyester chain prepared in the above step (Resin A) by further reaction with an unsaturated, dibasic acid such as fumaric acid (or maleic anhydride) and additional glycol to produce unsaturated polyester resins. This reaction with fumaric acid (or maleic anhydride) should be carried out between 185° and 200° C. This also is a critical step. We have found that at this stage if the reaction mass is heated at temperatures substantially above 200° C. for an appreciable length of time, the entire mass is quite likely to crosslink into an insoluble gel. The best quality polyester resins are obtained by using from 2 to 5 gram moles of fumaric acid (or maleic anhydride) for each 300 grams of rosin used in Step 1. A sufficient quantity of glycol is used to completely esterify the carboxyl groups present. Because of the loss of glycol that usually occurs, about a 10% excess over the stoichiometric amount of glycol is a good practice. It is, of course, necessary to take into account the excess glycol used in Step 2 when calculating the amount required in Step 3. In order to reduce the danger of gelling the polyester during this step, it is usually desirable to add a small amount (60 to 100 parts per million parts by weight) of a polymerization inhibitor along with the fumaric acid. Suitable inhibitors are polyhydric phenols such as quinones, hydroquinone, pyrocatechol, tertiarybutyl paracresol, tertiarybutyl catechol, and the like. We prefer the use of hydroquinone. When the acid number has been reduced to about 10 to 30, the temperature of the reaction mass is then allowed to drop to about 120° C., and Step 4 may be continued without recovery of the extended, unsaturated polyester resin (Resin B).

On the other hand, the reaction mass may be permitted to cool to room temperature and the alkali-resistant, unsaturated polyester resin recovered and held for future use as it has good shelf life. Because of the inclusion of the esterified rosin in the center of the polyester chain, Resin B is also alkali and water resistant.

FORMULATION OF CASTING-RESIN COMPOSITION FROM THE EXTENDED, UNSATURATED POLYESTER RESINS AND VINYL MONOMERS

As noted above, the reaction temperature for forming the unsaturated, extended polyester resins ranges from about 185 to 200° C. When the formulation of the casting-resin compositions is to be followed immediately by casting the resin, the temperature of the polyester resin (Resin B), which at this point has an acid number no higher than about 30, is allowed to drop to about 120° C., after which 25 to 50 weight percent of a vinyl monomer, on the weight of the polyester resin is added. Styrene is a good monomer. It may be desirable to add additional hydroquinone (or other polymerization inhibitor) along with the vinyl monomer so that the casting-resin formulation will contain about 0.01 weight percent inhibitor. This is Resin C. The polymerization inhibitor acts to prolong the shelf life of the casting resin. The total amount of inhibitor added to Resin B and Resin C will depend upon the desired shelf life of Resin C and will range from about 0.005 to about 0.02 weight percent of the total casting resin.

The same polymerization inhibitors may be used here as noted above. The use of hydroquinone is a good practice.

The vinyl monomer may range from about 10 to 90 percent of the total casting resin. Amounts ranging from about 20 to about 60 weight percent give good casting resins.

The vinyl monomer is preferably styrene, but vinyl toluene, vinyl acetate, butylacrylate, methyl methacrylate, vinyl naphthalene, diallyl phthalate, and the like, may be used.

When the casting resin (Resin C) is to be held for a period of time prior to casting or molding, the temperature of the reaction mass is cooled from about 185 to 200° C. to less than 100° C. (but not enough to solidify the composition) before the vinyl monomer and the polymerization inhibitor are added and intimately mixed. The composition is then cooled and packaged under an insert gas in tin-coated containers. The inert gas may be nitrogen or carbon dioxide. It is a critical feature that the casting resin be protected from atmospheric oxygen after the vinyl monomer is added until it is packaged, as indicated above. Use of an inert gas during the cooling stage over the surface of the casting resin (Resin C), along with the presence of the polymerization inhibitor, is a good practice.

MOLDING THE CASTING RESIN

The casting-resin compositions prepared in the manner described above can be cured by treatment with a peroxide catalyst to bring about a copolymerization of the mixture of vinyl monomer and Resin B by means well known in the art. We prepared castings by curing the resins between two sheets of plate glass separated by 0.125-inch neoprene strips, which were further supported with 0.125-inch brass bars. The assembly was held together with a series of C-clamps. The resins were cured using 1.5 weight percent of benzoyl peroxide as catalyst. The catalyzed resin was heated in the mold at 80° C. for four hours, followed by an increase of the temperature over 0.5 hour to 120° C., and held at this temperature for two hours. This is Resin D, which is water and alkali resistant.

A variety of peroxides may be used to cure (or copolymerize) these casting resins, depending on the reaction conditions desired. Room temperature cures may be obtained with such peroxides as methylethyl ketone peroxide, pinane hydroperoxide, or cumene hydroperoxide. If higher-temperature curing is desired, benzoyl peroxide, photosensitized oxidized pine gum peroxide, or dicumyl peroxide may be used. We have found that the addition of about 1.5% benzoyl peroxide gives a satisfactory cure. Percentages of the vinyl monomer and the polymerization inhibitor required will generally follow the amounts indicated above for the preparation of the casting resin (Resin C). The procedure for casting follows that described above.

The following examples will serve to illustrate the manner of practicing our invention. Parts and percentages are by weight, temperature is indicated in degrees centigrade, and p.p.m. represents "parts per million." Details of test methods are described in an article, "Gum Rosin Modified with $\beta$-Propiolactone in Unsaturated Polyesters," by Halbook, et al., I&EC Product Research and Development, vol. 2, September 1963, pages 182–5.

In the following example gum rosin is modified with $\beta$-propiolactone.

*Example 1*

In this example, a reaction vessel equipped with stirrer, inert gas inlet, thermometer, thermocouple, air-cooled condenser, and water trap was charged with 429 parts of WW grade gum rosin that contained approximately 60% abietic-type acids and had initial acid number of 166. The rosin was heated under an inert atmosphere to 170° C., and 93 parts of technical grade $\beta$-propiolactone were added over a 10-minute interval. The temperature was then raised to 225° C. over a 30-minute interval and held at 225° C. for four hours. On the up-heat four parts of the mixture refluxed out at 210–220° C. and was discarded. The recovered modified rosin had a color grade of N on the rosin color scale, an acid number of 243, and a ball-and-ring softening point of 126° C. The ultraviolet absorption spectrum of the sample indicated that it contained less than five weight percent abietic-type acids.

*Example 2*

In the following example, the procedure of Example 1 is repeated after which the modified rosin is esterified with 190 parts of diethylene glycol. This is approximately 60% excess of the theoretical amount required and is useful in speeding up the reaction. The temperature of the charge was then raised to 280° C. with stirring, under an inert atmosphere, and held for six hours, at which time the acid number had been reduced to 26. The polyester resin containing rosin in the center of the chain was then removed from the reaction vessel and stored in sealed containers. It has excellent shelf-life. This is Resin A.

The procedure of Example 2 is repeated except the excess diethylene glycol is removed by vacuum distillaation. The glycol-free product has excellent shelf-life but is slightly darker in shade due to the effect of the heat on the rosin.

*Example 3*

In this example, the procedure of Example 2 was repeated except the Resin A was not removed from the reaction vessel and the diethylene glycol was not removed by distillation. The charge from Example 2 was cooled from 280° C. to 200° C., and 333 parts of fumaric acid (two moles per 300 grams rosin), 268.5 parts of diethylene glycol, and 80 p.p.m. hydroquinone were added, parts here being in grams. The charge was heated at 190 to 195° C. for seven hours with stirring under an inert gas. During the extension of the polyester chain, the water was separated from the refluxing diethylene glycol by means of a short fractionating column. When the ultra-violet (U.V.) absorption at 241 millimicrons becomes constant the reaction of the dibasic acids with the diethylene glycol is completed and the acid number remains constant, or may actually be reduced. The extended, unsaturated polyester resins containing rosin in the center of the chain is then cooled. This is Resin B, and is a viscous liquid to a soft resin. It has good shelf-life, especially when stored in sealed containers.

*Example 4*

In this example, a casting resin (Resin C) was prepared. The procedure of Example 3 was repeated, except the Resin B was not removed from the reaction vessel. The temperature of the charge was reduced from 190–195° C. to 140° C., and additional hydroquinone was added to give a total of 0.01 weight percent in the subsequent styrene dilution. When the polyester (Resin B) had cooled to 120° C., it was converted into a casting resin by adding 25 parts of styrene monomer containing 0.04 weight percent quinone to 75 parts of ester. During the addition of the styrene monomer and the subsequent cooling operation, the charge was stirred and maintained under a blanket of inert gas. When the charge of casting resins comprising styrene monomer and the extended polyester resin having rosin in the center of the polyester resin chain had cooled to ambient room temperature, the liquid product was transferred to a tin-coated container and sealed under a blanket of carbon dioxide gas. When thus stored, this casting resin had good shelf life, had an acid number of 19, and a viscosity (Brookfield) of 24.2 poise. This is Resin C.

*Example 5*

In this example, castings were prepared by curing the product of Example 4 (Resin C) between two sheets of plate glass separated by 0.125-inch neoprene strips, which were further supported wtih 0.125-inch brass bars. The assembly was held together with a series of C-clamps. The casting resin was cured using 1.5 weight percent benzoyl peroxide on the weight of the casting resin as catalyst. The catalyzed resin was heated in the mold at 80° C. for four hours, followed by an increase in temperature over 0.5 hour to 120° C. and held at this temperature for two hours. The cured, or crosslinked, resin is Resin D. It is alkali and water resistant.

Test specimens were then cut from the casting with a high-speed abrasive wheel and with water as a cooling lubricant. The cured resin had the following properties:

Tensile strength p.s.i. _____ 6,650
Elongation percent _____ 7.0
Flexural strength p.s.i. $\times 10^3$ _____ 13.4
Barcol hardness _____ 30
Water absorption, percent in 24 hours _____ 0.21
Attack by 10% sodium hydroxide, 1 week _____ None
Attack by 30% sulfuric acid, 1 week _____ None
Weathering, visible effect after 1 year _____ None

*Example 6*

The procedure of Example 5 is repeated except webbing of fiber glass is incorporated in the mold before the addition of the casting resin. After curing, portions of the plastic containing the glass fibers were tested for water absorption, alkali resistance, sulphuric acid resistance and weathering and the results are generally similar to those obtained in Example 5. The cured plastic coats the fiber in a satisfactory manner.

*Example 7*

Gum rosin was modified by the procedure of Example 1 and then esterified by the procedure of Example 2. The modified rosin ester containing 429 parts of rosin was cooled to 200° C., and 509 parts fumaric acid (three moles per 300 grams of rosin), 431.5 parts of diethylene glycol and 80 p.p.m. of hydroquinone were added, according to the procedure of Example 3. A casting resin was then prepared as in Example 4. This casting resin had an acid number of 18 and a viscosity (Brookfield) of 28.4 poise. This resin (Resin C) was isolated and stored in a sealed container.

Castings were then prepared according to the procedure of Example 5 and the cured resin (Resin D) had the following properties:

Tensile strength p.s.i. _____ 6,061
Elongation percent _____ 6.5
Flexural strength p.s.i. $\times 10^3$ _____ 16.9
Barcol hardness _____ 36
Water absorption, percent in 24 hours _____ 0.21
Attack by 10% sodium hydroxide, 1 week _____ None
Attack by 30% sulfuric acid, 1 week _____ None
Weathering, visible effect after 1 year _____ None

*Example 8*

A reaction vessel equipped as described in Example 1, was charged with 1200 parts of gum rosin, from the same lot used in Example 1. The rosin was heated to 170° C. under an inert atmosphere and 193 parts (16 parts of β-propiolactone per 100 parts rosin) of technical grade β-propiolactone was added over a 10-minute interval. The temperature was then raised to 225° C. over a 30-minute interval and held at 225–30° C. for four hours. The modified rosin had a color grade of WW on the rosin color scale. The acid number was 235, and the ultraviolet spectrum indicated that it contained less than five weight percent abietic-type acids.

The reaction vessel containing the modified rosin was then charged with 527 parts of diethylene glycol. The reaction conditions of Example 2 were duplicated. After six hours the acid number was 21 and the reaction product was a viscous liquid at room temperature.

The modified rosin ester containing 1200 parts of rosin was cooled to 200° C. and 929 parts (2 moles per 300 g. of rosin) of fumaric acid, 740 parts of diethylene glycol and 80 p.p.m. of hydroquinone were added. The contents of the reaction vessel were heated at 190–195° C. for seven hours. During esterification the water was separated from the refluxing diethylene glycol by means of a short column. The polyester was cooled to 140° C. and additional hydroquinone was added to give a total of 0.01% in a 25% styrene dilution.

When the polyester had cooled to 120° C. it was divided into four equal parts and converted into casting resins by adding 20, 25, 30, and 35 parts of styrene containing 0.04 weight percent quinone to 80, 75, 70, and 65 parts of the ester, respectively. The liquid and cured resins had the following characteristics:

|  | Styrene Content, Percent | | | |
| --- | --- | --- | --- | --- |
|  | 20 | 25 | 30 | 35 |
| Liquid Resin: | | | | |
| Viscosity, poise, Brookfield | 91 | 32 | 10 | 4 |
| Acid Number | 18 | 17 | 16 | 15 |
| Cured Resin: | | | | |
| Tensile strength | 8,200 | 7,910 | 9,460 | 8,370 |
| Elongation, percent | 8.7 | 8.4 | 10.9 | 9.4 |
| Flexural strength, p.s.i.×10³ | 13.0 | 15.7 | 15.9 | 16.6 |
| Attack by 10% sodium hydroxide, 1 week | None | None | None | None |
| Attack by 30% sulfuric acid, 1 week | None | None | None | None |

*Example 9*

Using the procedure of Example 1, a modified gum rosin containing 16 parts of β-propiolactone per 100 parts of rosin was prepared by condensing 353 parts of rosin with 57 parts of β-propiolactone. The gum rosin was from the same lot as that of Example 1. The modified product had an acid number of 240, softening point of 121° C. by the ball and ring method and color grade of WW on the rosin scale.

The reaction vessel containing the modified rosin was charged with 135 parts of diethylene glycol and esterified by the method described in Example 2. After six hours the acid number was 25 and the product was a viscous liquid at room temperature.

The modified-rosin ester containing 353 parts of rosin was cooled to 200° C. and 407 parts of fumaric acid (3 moles per 300 g. of rosin), 263 parts of diethylene glycol and 80 p.p.m. of hydroquinone were added. The processing procedures of Examples 3 and 4, including the addition of styrene and inhibitor were duplicated. The liquid resin (Resin C) had an acid number of 18.5 and a viscosity (Brookfield) of 15.6 poise.

The above product was cured as described in Example 5. The cured resin (Resin D) had the following properties:

Tensile strength p.s.i. _____ 9,358
Elongation percent _____ 10.1
Flexural strength p.s.i.×10³ _____ 17.6
Barcol hardness _____ 38
Water absorption, percent in 24 hours _____ 0.20
Attack by 10% sodium hydroxide, 1 week _____ None
Attack by 30% sulfuric acid, 1 week _____ None

*Example 10*

A modified gum rosin containing four parts of β-propiolactone per 100 parts of rosin was prepared by condensing 517 parts of rosin with 21 parts of β-propiolactone. The procedure of Example 1 was used for the condensation. The rosin was from the same lot as that of Example 1. The modified product had an acid number of 180.

The reaction vessel containing the modified rosin was charged with 161 parts (75% excess) of diethylene glycol and esterified by the procedure described in Example 2. After six hours the acid number was 26.

The modified rosin ester containing 517 parts of rosin was cooled to 200° C. and 398 parts (2 moles per 300 g. of rosin) of fumaric acid, 335 parts of diethylene glycol and 80 p.p.m. of hydroquinone was added. The polyester chain was extended by the method described in Examples 3 and 4, including the addition of styrene and inhibitors. The liquid resin (Resin C) had an acid number of 24 and a viscosity (Brookfield) of 22.7 poise.

The resin was cured using the procedure of Example 5. The cured resin (Resin D) had the following characteristics:

Tensile strength p.s.i. _____ 9,210
Elongation percent _____ 13.1
Flexural strength p.s.i.×10³ _____ 13.3
Barcol hardness _____ 37
Water absorption, percent in 24 hours _____ 0.32
Attack by 10% sodium hydroxide, 1 week _____ None
Attack by 30% sulfuric acid, 1 week _____ None

*Example 11*

A portion of the β-propiolactone-modified rosin prepared in Example 1 was dissolved in three times its weight of carbon tetrachloride. On standing overnight, about 40% of this product crystallized. These crystals proved to be a molecular compound of carbon tetrachloride and the pure dibasic acid condensation product of rosin and β-propiolactone. After being air dried, these crystals had a neutral equivalent of 283; theory for one mole of carbon tetrachloride per mole of bibasic acid is 264. The crystallized material was then heated at 160° C. for four hours in vacuum, after which the crystals had a neutral equivalent of 191; theory for pure β-propiolactone adduct of rosin is 187, indicating that the modified product was essentially the dibasic acid. The acid number of this product was 293.

A reaction vessel equipped, as described in Example 1, was then charged with 647 parts of the above vacuum-dried, rosin dicarboxylic acid and 300 parts of diethylene glycol. The temperature was raised to 280–295° C., with stirring and held for six hours. Water which formed was separated from the refluxing diethylene glycol by means of a short column and removed from the reaction vessel. After six hours the ester, which was a viscous liquid, had an acid number of 18.

The reaction mixture containing the discarboxylic acid ester was cooled to 200° C. and 402 parts (two moles per mole of dicarboxylic acid) of fumaric acid, 300 parts of diethylene glycol, and 80 p.p.m. of hydroquinone were added. The processing procedures of Examples 3 and 4, including the addition of styrene and inhibitors, were duplicated. The liquid resin (Resin C) had an acid number of 19 and viscosity (Brookfield) of 17.8 poise.

The procedure of Example 5 was duplicated. The cured resin (Resin D) had the following properties:

Tensile strength p.s.i. _____ 5,340
Elongation percent _____ 5.6
Flexural strength p.s.i.×10³ _____ 16.4
Barcol hardness _____ 34
Water absorption, percent in 24 hours _____ 0.25
Attack by 10% sodium hydroxide, 1 week _____ None
Attack by 30% sulfuric acid, 1 week _____ None In the above example the carbon tetrachloride attached to the crystalline modified rosin was eliminated by heating at 160° C. for four hours under vacuum. It is unnecessary to carry out this step in commercial practice because in the subsequent preparation of the extended, unsaturated polyester resin having rosin in the center of the chain the temperature of the hot melt is sufficiently high to evoporate the carbon tetrachloride. However, when formulating the charge for the esterification step, an allowance must be made for the extra weight imparted to the modified rosin due to the attachment of the carbon tetrachloride.

*Example 12*

A reaction vessel equipped as in Example 1 was charged with 425 parts of rosin from the lot used in Example 1. The rosin was heated under nitrogen to 170° C. and 68 parts of technical grade β-propiolactone were added over a 10-minute interval. The temperature was then raised to 225–230° C. over a 30-minute interval and held for four hours. The acid number was 233.

The reaction vessel containing the modified rosin was heated, with stirring, to 260–280° C. as in Example 2.

1,2-propanediol was added slowly over a 6-hour period. The water formed was fractionated from the refluxing diol by means of the air-cooled condenser and separated in a water trap. During the six hours, 166 g. (100% excess) of 1,2-propanediol was added and the acid number dropped to 5.4.

The modified rosin ester containing 425 parts of rosin was cooled to 150° C., and 275 parts (2 moles per 300 g. of rosin) of maleic anhydride added. The pot temperature was raised to 190° C. and 130 parts of 1,2-propanediol was added during the next six hours. After eight hours the temperature was dropped to 170° C. and the ester was steam-sparged for 0.25 hour. The ester was cooled to 120° C. and converted to a casting resin by adding 25 parts of styrene containing 0.04 weight percent quinone to 75 parts of ester. The liquid resin (Resin C) had an acid number of 19.

Castings were prepared duplicating the procedure described in Example 5. The cured resin (Resin D) had the following properties:

| | |
|---|---|
| Tensile strength, p.s.i. | 5,100 |
| Elongation percent | 5.0 |
| Barcol hardness | 40 |
| Water absorption, percent in 24 hours | 0.19 |
| Attack by 10% sodium hydroxide, 1 week | None |
| Attack by 30% sulfuric acid, 1 week | None |

*Example 13*

A reaction vessel equipped as in Example 1, was charged with 150 parts of gum rosin and 36 parts of β-propiolactone polymer. This β-propiolactone polymer is described by T. L. Gresham et al., J. Amer. Chem. Soc., 70, 998 (1948). The temperature was raised slowly to 225° C. over a 0.5 hour interval and held at 225° for three hours. There was no reflux-out of any of the mixture during the heating. On sparging with nitrogen after the three hours heating, two parts of a light oil were obtained. The acid number of the resin was 236 and the ultraviolet absorption spectrum indicated the presence of less than 5% abietic-type acids. The color grade was WG on the rosin scale and the ball and ring softening point was 130. This resin appeared to be quite similar to that obtained in Example 1.

This β-propiolactone-modified rosin was converted into an unsaturated ester, the ester diluted with styrene and cured by the procedure described in Example 5, to a tough plastic having a Barcol hardness of 34 and showing no attack after exposure to 10% sodium hydroxide for 1 week.

*Example 14*

The procedure of Example 1 is repeated using wood rosin in place of the gum rosin of Example 1. A modified rosin moiety is obtained. When this product is further treated by the procedures of Examples 2, 3, 4, and 5, the copolymerized resin (Resin D) is alkali-and-water-resistant.

*Example 15*

The procedure of Example 14 is repeated using, however, tall-oil rosin in place of the wood rosin of Example 14. A modified rosin moiety is obtained. When this product is further treated by the procedures of Examples 2, 3, 4, and 5, the copolymerized resin (Resin D) is alkali- and water-resistant.

*Example 16*

The reaction vessel equipped as described in Example 1 was charged with 588 parts gum rosin from the same lot used in Example 1. The rosin was then heated to 170° C. under an inert atmosphere and 112 parts technical grade β-propiolactone (16 parts β-propiolactone per 100 parts rosin) were added over a 10-minute interval. The temperature was then raised to 225° C., with stirring, over a 30-minute interval and held at 225–230° C. for four hours. The resultant modified rosin had a softening point of 118° C. (ball and ring), a color grade of N on the rosin color scale, and an acid number of 240. The ultraviolet spectrum connected with it contained less than 5% abietic-type acids.

Using the general procedure of Example 2, the temperature of the reaction vessel containing the modified rosin was raised to 265° C. and 218 parts of 1,2-propanediol was added slowly over a period of about seven hours. The water was fractioned from the refluxing 1,2-propanediol by means of a short column. The contents of the vessel were steam sparged at 200° C. for one hour to remove the excess diol. A yield of 865 parts of an ester with a softening point of 91° C. ring-and-ball method, a color grade of N on the rosin scale, and an acid number of 9, were obtained.

We claim:
1. A process for modifying an unmodified rosin with a lactone, which process comprises the following steps:
    (a) charging to a reaction vessel an unmodified rosin;
    (b) blanketing the unmodified rosin with an inert gas;
    (c) heating the unmodified rosin, with stirring, to at least 160° C. and to not more than about 200° C.;
    (d) adding a lactone selected from the group consisting of β-propiolactone and polymeric β-propiolactone to the resulting molten rosin slowly to avoid excessive refluxing and loss of the lactone, said lactone being added in the amount of about from 3 to 25 parts per 100 parts of the unmodified rosin, all parts by weight;
    (e) slowly increasing the temperature of the molten product of step (d) to not more than about 250° C.;
    (f) maintaining a period of dwell for at least two hours and not more than six hours under the blanket of inert gas with stirring until the U.V absorption at 241 millimicrons becomes constant; and
    (g) thereafter recovering the resulting lactone-modified rosin.
2. A product produced by the process of claim 1.
3. A process according to claim 1 wherein the unmodified rosin is selected from the group consisting of gum rosin, wood rosin, and tall-oil rosin.
4. A process according to claim 1 wherein the lactone is β-propiolactone and the rosin is gum rosin.
5. A process according to claim 1 wherein the lactone is a polymeric β-propiolactone and the rosin is gum rosin.
6. A process according to claim 1 wherein the inert gas is selected from the group consisting of nitrogen and carbon dioxide.
7. A process according to claim 1 wherein the molten mass is maintained at a temperature of about from 200° C. to 240° C. and the period of dwell is about from 2.0 to 5.0 hours.
8. A process according to claim 1 wherein the lactone is β-propiolactone, the unmodified rosin is gum rosin, the amount of lactone to unmodified rosin is at least 12 parts per 100 parts by weight, and the recovered β-propiolactone-modified rosin is purified by crystallization from carbon tetrachloride.
9. A process for esterifying a lactone-modified rosin to form a polyester resin containing rosin in the center of the chain and having a molecular weight of about from 460 to 2200, which process comprises the following steps:
    (a) charging to a reaction vessel a lactone-modified rosin consisting of a product of claim 2;
    (b) blanketing the modified rosin with an inert gas;
    (c) heating the modified rosin, with stirring, under the blanket of inert gas to form a hot melt;
    (d) slowly charging to the hot melt an excess of a polyol selected from the group consisting of ethylene glycol, diethylene glycol, triethylene glycol, propylene glycol, dipropylene glycol, 1,2-propanediol, 1,3-propanediol, and 1,4-butanediol, said polyol being added in the amount of about from 12 to 80 parts per 100 parts of the lactone-modified rosin, all parts by weight;
(e) increasing the temperature of the polyol and modified rosin hot melt to not less than about 250° C. and not more than about 300° C., with stirring, under the inert atmosphere;
(f) maintaining a period of dwell until the acid number of the charge is reduced to not more than about 30, thereby to produce a polyester resin containing rosin in the center of the chain and having a molecular weight of about from 460 to 2200;
(g) cooling the polyester resin to below about 100° C.; and
(h) thereafter recovering the polyester resin.

10. A product produced by the process of claim 9.
11. A process according to claim 9 wherein the polyol is diethylene glycol.
12. A process according to claim 9 wherein the inert gas is selected from the group consisting of nitrogen and carbon dioxide.
13. A process for extending a lactone-modified rosin polyester resin having rosin in the center of the polyester chain with an unsaturated dibasic acid and a polyol to give an extended, unsaturated polyester resin having a molecular weight of about from 1000 to 3000, which process comprises the following steps:
(a) charging to a reaction vessel a lactone-modified rosin polyester resin consisting of a product of claim 10;
(b) blanketing the lactone-modified rosin polyester resin with an inert gas;
(c) heating, with stirring, the lactone-modified rosin polyester resin to not more than 200° C.;
(d) charging to the reaction vessel an unsaturated dibasic acid selected from the group consisting of fumaric acid and maleic anhydride, a polyol selected from the group consisting of ethylene glycol, diethylene glycol, triethylene glycol, propylene glycol, dipropylene glycol, 1,2-propanediol, 1,3-propanediol, and 1,4-butanediol, and a polymerization inhibitor selected from the group consisting of quinone, hydroquinone, pyrocatechol, tert-butyl paracresol, and tert-butyl catechol, said unsaturated dibasic acid being added in the amount of about from 35 to 125 parts, the polyol being added in the amount of about from 12 to 130 parts, and the polymerization inhibitor being added in the amount of about from 0.005 to 0.02 parts, all parts by weight and based on 100 parts of the lactone-modified rosin polyester resin;
(e) maintaining a period of dwell at about 190° C. to 200° C., with stirring, under the blanket of inert gas until the acid number is reduced to about 10 to 30; and
(f) thereafter recovering the extended, unsaturated polyester resin having rosin in the center of the polyester chain and a molecular weight of about from 1000 to 3000.

14. A process according to claim 13 wherein the inert gas is selected from the group consisting of nitrogen and carbon dioxide.
15. A product produced by the process of claim 13.
16. A process according to claim 13 wherein the dibasic acid is fumaric, the polyol is diethylene glycol, and the polymerization inhibitor is hydroquinone.
17. A process according to claim 13 wherein the dibasic acid is maleic anhydride, the polyol is diethylene glycol, the inhibitor is hydroquinone and the resultant extended, unsaturated polyester resin having rosin in the center of the polyester chain has a molecular weight of about from 1000 to 2500.
18. A process for the preparation of an unpolymerized casting resin from an extended, unsaturated polyester resin having rosin in the center of the polyester chain and having a molecular weight of about from 1000 to 3000 with a vinyl monomer, which process comprises the following steps:
(a) charging to a reaction vessel an extended, unsaturated polyester resin consisting of a product of claim 15;
(b) adding to the polyester resin a polymerization inhibitor selected from the group consisting of quinone, hydroquinone, pyrocatechol, tert-butyl paracresol, and tert-butyl catechol, said polymerization inhibitor being added in the amount of about from 0.005 to 0.02 part per 100 parts of said extended, unsaturated polyester resin, all parts by weight;
(c) blanketing the charge with an inert gas;
(d) heating, with stirring, the charge to a temperature no greater than about 120° C.;
(e) charging to the hot melt a vinyl monomer selected from the group consisting of styrene, vinyl toluene, vinyl acetate, butyl acrylate, methyl methacrylate, vinyl naphthalene, and diallyl phthallate, said vinyl monomer being added in the amount of about from 20 to 100 parts per 100 parts of said extended, unsaturated polyester resin, all parts by weight, and containing a sufficient additional amount of said polymerization inhibitor to give a total weight of inhibitor of about from 0.005 to 0.02 part by weight per 100 parts of the hot melt;
(f) cooling, with stirring, under the blanket of inert gas to about ambient temperature; and
(g) recovering the resulting unpolymerized casting resin.

19. A product produced by the process of claim 18.
20. A process according to claim 18 wherein the inert gas is selected from the group consisting of nitrogen and carbon dioxide.
21. A process according to claim 18 wherein the vinyl monomer is styrene.
22. A process according to claim 18 wherein the vinyl monomer is methyl methacrylate.
23. A process for the preparation of an alkali-resistant and a water-resistant plastic composition, which process comprises the following steps:
(a) charging to a reaction vessel an extended unsaturated polyester resin consisting of a product of claim 15;
(b) adding to the polyester resin a polymerization inhibitor selected from the group consisting of quinone, hydroquinone, pyrocatechol, tert-butyl paracresol, and tert-butyl catechol, said polymerization inhibitor being added in the amount of about from 0.005 to 0.02 part per 100 parts of said extended, unsaturated polyester resin, all parts by weight;
(c) blanketing the charge with an inert gas;
(d) heating, with stirring, the charge to a temperature no greater than about 120° C.;
(e) charging to the hot melt a vinyl monomer selected from the group consisting of styrene, vinyl toluene, vinyl acetate, butyl acrylate, methyl methacrylate, vinyl naphthalene, and diallyl phthallate, said vinyl monomer being added in the amount of about from 20 to 100 part per 100 parts of said extended, unsaturated polyester resin, all parts by weight, and containing a sufficient additional amount of said polymerization inhibitor to give a total weight of inhibitor of about from 0.005 to 0.02 part by weight per 100 parts of the hot melt;
(f) charging to the hot melt, with stirring, under the blanket of the inert gas, a peroxide catalyst selected from the group consisting of benzoyl peroxide, methyl ethyl ketone peroxide, pinane hydroperoxide, cumene hydroperoxide, photosensitized oxidized pine gum peroxide, and dicumyl peroxide, said peroxide catalyst being added in the amount of about from 0.5 to 2.0 part by weight of the hot melt;
(g) transferring the resulting casting resin containing the peroxide catalyst to a mold; and thereafter (h) copolymerizing the said extended, unsaturated polyester resin and the vinyl monomer to produce an alkali-resistant and water-resistant plastic composition.

24. A product produced by the process of claim 23.

25. A process according to claim 23 wherein the copolymerization of step (h) is carried out by heating the casing resin in the mold at 80° C. for about four hours, followed by an increase of the tempeerature over 0.5 hour to 120° C., and holding at 120° C. for about two hours.

26. A process according to claim 23 wherein the peroxide is benzoyl peroxide, the vinyl monomer is styrene, and the polymerization inhibitor is hydroquinone.

27. A process according to claim 23 wherein a fiber glass webbing is embedded in a catalyzed casting resin prior to copolymerization.

References Cited by the Examiner
UNITED STATES PATENTS

| | | | |
|---|---|---|---|
| 1,226,760 | 5/1917 | Ellis | 260—104 |
| 2,355,782 | 8/1944 | Cox | 260—97 |
| 2,382,545 | 8/1945 | Cox | 260—344.6 |
| 2,504,989 | 4/1950 | Lawrence | 260—104 |

OTHER REFERENCES

Halbrook et al.: Industrial and Engineering Chemistry Product Research and Development, vol. 2, No. 3, Call No. TP1. 1532.

LEON J. BERCOVITZ, *Primary Examiner.*

DONALD E. CZAJA, *Examiner.*

G. McKELVEY, *Assistant Examiner.*